United States Patent Office 3,403,162
Patented Sept. 24, 1968

3,403,162
1-PHENYL-2-PYRIDYLBENZOCYCLOALKENES AND DERIVATIVES THEREOF
Daniel Lednicer, Portage Township, Kalamazoo County, and John C. Babcock, Kalamazoo, Mich., assignors to The Upjohn Company, Kalamazoo, Mich., a corporation of Delaware
No Drawing. Filed May 29, 1963, Ser. No. 284,008
2 Claims. (Cl. 260—297)

This invention relates to novel polycyclic organic compounds and is more particularly concerned with novel 1 - phenyl - 2 - pyridylbenzocycloalkenes and derivatives thereof, and acid addition salts and quaternary ammonium salts thereof and with processes for their preparation.

The novel compounds of the invention are selected from the class consisting of
(a) Compounds having the formula:

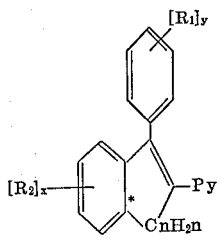

wherein —$C_nH_{2n}$—, in which $n$ is an integer from 1 to 7, inclusive, represents an alkylene radical and separates the carbon atom carrying the radical Py from the carbon atom marked with an asterisk by from 1 to 3 carbon atoms, inclusive, Py is selected from the class consisting of unsubstituted 2-pyridyl, 3-pyridyl, and 4-pyridyl, and 2-pyridyl, 3-pyridyl, and 4-pyridyl substituted by at least one radical selected from the class consisting of lower-alkyl, lower-alkoxy, and halogen, $R_1$ is selected from the class consisting of lower-alkyl, lower-alkoxy, hydroxy, the radical

wherein $R_3$ and $R_4$ are selected from the class consisting of lower-alkyl and lower-alkyl linked together to form, with the attached nitrogen atom, a 5 to 7 ring atom saturated heterocyclic radical, and

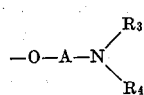

wherein A is an alkylene radical from 2 to 6 carbon atoms, inclusive, and $R_3$ and $R_4$ are as above defined, $R_2$ is selected from the class consisting of lower-alkyl, lower-alkenyl, trifluoromethyl, lower-alkoxy, lower-alkenyloxy, lower-alkylenedioxy, cycloalkoxy from 4 to 7 carbon atoms, inclusive, halogen, lower-alkylmercapto, and

wherein $R_3$ and $R_4$ are as above defined, and $x$ are integers from 0 to 4, inclusive;
(b) the pharmacologically acceptable acid addition salts thereof; and
(c) the quaternary ammonium salts of the compounds of the above formula wherein the anion of the quaternary salt is that of a pharmacologically acceptable acid.

The alkylene radical —$C_nH_{2n}$— which forms part of the ring structure of the compound (I) contains from 1 to 7 carbon atoms, inclusive, but not more than 3 of the carbon atoms of the alkylene radical can be ring carbon atoms in the compound (I). In other words, the alkylene radical —$C_nH_{2n}$— can have any of the following structures:

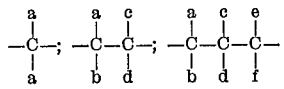

wherein $a$, $b$, $c$, $d$, $e$ and $f$ represent hydrogen or alkyl, provided that the total number of carbon atoms in the alkylene radical is not greater than 7. Examples of such —$C_nH_{2n}$— alkylene radicals are methylene, isopropylidene, ethylene, propylene, trimethylene, 1-methyltrimethylene, 1,2 - dimethylethylene, 1 - butyltrimethylene, 1-amylethylene, and the like.

The term "lower-alkyl" means an alkyl group containing from 1 to 8 carbon atoms, inclusive, such as methyl, ethyl, propyl, butyl, amyl, hexyl, heptyl, octyl, and isomeric forms thereof. The term "lower-alkenyl" means an alkenyl group containing from 2 to 8 carbon atoms, inclusive, such as vinyl, allyl, butenyl, pentenyl, hexenyl, heptenyl, octenyl, and isomeric forms thereof. The term "lower-alkoxy" means an alkoxy group containing from 1 to 8 carbon atoms, inclusive, such as methoxy, ethoxy, propoxy, butoxy, amyloxy, hexyloxy, heptyloxy, octyloxy, and isomeric forms thereof. The term "lower-alkenyloxy" means an alkenyloxy group containing from 2 to 8 carbon atoms, inclusive, such as vinyloxy, allyloxy, butenyloxy, pentenyloxy, hexenyloxy, heptenyloxy, octenyloxy, and isomeric forms thereof. The term "cycloalkoxy from 4 to 7 carbon atoms, inclusive" means cyclobutyloxy, cyclopentyloxy, cyclohexyloxy, and cycloheptyloxy. The term "halogen" is inclusive of fluorine, chlorine, bromine, and iodine. The term "lower-alkylmercapto" means an alkylmercapto group containing from 1 to 8 carbon atoms, inclusive, such as methylmercapto, ethylmercapto, propylmercapto, butylmercapto, amylmercapto, hexylmercapto, heptylmercapto, octylmercapto, and isomeric forms thereof. The term "lower-alkylenedioxy" means an alkylenedioxy group containing from 1 to 8 carbon atoms, inclusive, such as methylenedioxy, ethylenedioxy, propylenedioxy, butylenedioxy, pentylenedioxy, hexylenedioxy, heptylenedioxy, octylenedioxy, and isomeric forms thereof. The term "alkylene radical from 2 to 6 carbon atoms, inclusive" means ethylene, propylene, butylene, pentylene, hexylene, and isomeric forms thereof. The term "lower-alkyl linked together to form, with the attached nitrogen atom, a 5 to 7 ring atom saturated heterocyclic radical" is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethylenimino, homopiperazino, homomorpholino, and the like.

The acid addition salts of the invention comprise the salts of the compounds having the Formula I with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids, and the like.

The quaternary ammonium salts of the invention are the salts obtained by reacting the free bases having the Formula I with quaternating agents, for example, lower-alkyl halides, lower-alkenyl halides, di(lower-alkyl) sulfates, aralkyl halides, lower-alkyl arylsulfonates, and the like. The terms "lower-alkyl" and "lower-alkenyl" have the meaning hereinbefore defined. The term "aralkyl" means an aralkyl group containing from 7 to 13 carbon atoms, inclusive, such as benzyl, phenethyl, phenylpropyl, benzhydryl, and the like. The term "lower-alkyl arylsulfonates" means the esters formed from lower-alkyl alcohols and arylsulfonic acids such as benzenesulfonic, toluenesulfonic, xylenesulfonic, and like acids. Examples of quaternary salts of the compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate, and the like. Where the compound (I) contains one or more tertiary-amino groups in addition to the pyridyl radical Py, i.e., where either $R_1$ and/or $R_2$ represents

and/or $R_1$ represents

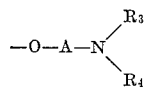

the corresponding bis- or poly-quaternary ammonium salts are formed by reacting (I) with the appropriate quaternating agent.

The novel compounds of the invention, including the free bases of Formula I, the acid addition salts thereof, and the quaternary ammonium salts thereof, possess pharmacological activity. Illustratively, the compounds of the invention are useful as antifertility agents, anti-estrogenic agents, gonadotrophin-inhibiting agents, and as agents for the lowering of lipid and cholesterol blood levels in mammals, including man and animals of economic value. In addition, the compounds of the invention possess activity as anti-inflammatory agents which makes them useful, for example, in human therapy when administered topically for the alleviation of inflammation and burns, and also in the treatment of atopic dermatitis and contact dermatitis. In addition, the compounds of the invention possess activity as central nervous system stimulants, antifungal agents, and enzyme inhibitors.

For purposes of administration to mammals, the novel compounds of the invention can be combined with solid or liquid pharmaceutical carriers and formulated in the form of tablets, powder packets, capsules, and the like solid dosage forms, using starch and like excipients, or dissolved or suspended in suitable solvents or vehicles, for oral or parenteral administration.

In addition to their pharmacological activity, the compounds of the invention are also useful as intermediates. For example, the compounds of the Formula I can be reacted with fluosilicic acid to form the fluosilicate salts which in dilute aqueous solution are effective mothproofing agents as more fully disclosed in U.S. Patents 2,075,359 and 1,915,334.

The compounds of the invention having the Formula I can be prepared by reacting the appropriately substituted ketone having the following formula:

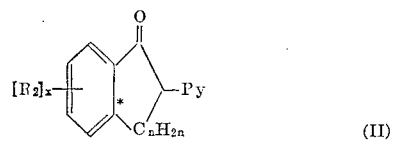

wherein $R_2$, $x$, Py, and —$C_nH_{2n}$— have the significance above defined, with the appropriately substituted Grignard reagent having the following formula:

[$R_1$]$_y$ ⟨⟩—MgHal    (III)

wherein $R_1$ and $y$ are as hereinbefore defined and Hal represents a halogen atom. The reaction is carried out advantageously in the presence of an inert solvent under anhydrous conditions in accordance with the established procedure for Grignard reactions. Suitable inert solvents include diisopropyl ether, diisobutyl ether, dibutyl ether, tetrahydrofuran, and the like. The reaction can be carried out at temperatures within the range of about 0° C. to about the boiling point of the solvent employed, and is advantageously carried out at elevated temperatures, for example, at or near the boiling point of the reaction mixture. In general, the reaction is carried out at temperatures within the range of about 0° C. to about 150° C., preferably within the range of about 30° C. to about 100° C.

The reaction time varies within wide limits according to the temperature at which the reaction is conducted. Generally speaking, where the reaction is carried out at elevated temperatures, such as the boiling point of the reaction mixture, it is necessary to employ a reaction time of the order of several hours to ensure completion of the reaction.

The desired compound having the Formula I can be isolated from the reaction mixture by conventional procedures, for example, by decomposing the reaction mixture with water, ammonium chloride, and the like, followed by separation of the organic layer and removal of solvent therefrom. In many cases the product so obtained is largely the desired compound (I) contaminated with minor impurities and unchanged starting material which can be removed by simple procedures, for example, by isolation of the desired compound (I) as an acid addition salt.

However, in some cases the desired compound (I) is contaminated with appreciable quantities of the corresponding carbinol having the Formula IV below and in certain cases the reaction product obtained is largely this compound containing only a small amount of the desired compound (I).

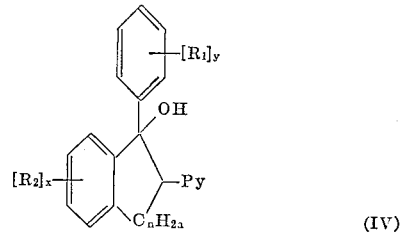

In the above formula $R_1$, $R_2$, $x$, $y$, Py, and —$C_nH_{2n}$— have the significance hereinbefore defined.

The compound (IV), when obtained as the major reaction product or when present in significant quantities in the above-described reaction product, can be converted to the desired compound (I) by dehydration. The dehydration can be effected in most instances by heating the compound (IV) in an inert solvent such as benzene, toluene, xylene, and the like, which forms an azeotrope with water, in the presence of a trace of a strong acid such as hydrochloric, sulphuric, p-toluenesulfonic acids, and the like. The water which is formed in the dehydration is removed from the reaction mixture azeotropically. There is thereby obtained a solution of the desired compound (I) from which the latter can be isolated by evaporation or other conventional procedures.

In certain cases, the dehydration of the compound (IV) requires more drastic conditions such as heating the compound at, or slightly above, its melting point, preferably in the presence of an inert gas, until evolution of water is complete.

Where the group $R_1$ in the Grignard reagent (III) represents hydroxy this group is preferably protected by conversion to the corresponding tetrahydropyranyl ether before preparation of the Grignard and use of the latter in the process of the invention. Thus, the halophenol from which the Grignard is made is first reacted with 2,3-dihydropyran in the presence of a trace of p-toluenesulfonic acid or a mineral acid, and the resulting ether is converted to the Grignard reagent. After the reaction of the Grignard reagent with the ketone is complete, the free hydroxy group in the final product can be regenerated by hydrolysis of the tetrahydropyranyl ether using mineral acid.

The Grignard reagents having the Formula III which are employed as starting materials in the process of the invention can be prepared by reaction of magnesium, in an anhydrous inert organic solvent such as diisopropyl ether, diisobutyl ether, dibutyl ether, tetrahydrofuran, and the like, with the appropriately substituted halobenzene having the formula:

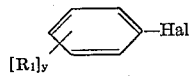

wherein $R_1$, $y$, and Hal have the significance above defined. The halobenzenes employed as starting materials in the preparation of the Grignard reagents are, for the most part, known compounds which can be prepared by procedures conventional in the art for the preparation of halobenzenes; see, for example, Chemistry of Carbon Compounds, volume IIIA, p. 113 et seq., 1954, ed., E. H. Rodd [Elsevier Publishing Company]. Thus, the above halobenzenes in which $R_1$ represents lower-alkyl, lower-alkoxy, hydroxy, and

(wherein $R_3$ and $R_4$ are as hereinbefore defined) are known compounds. The halobenzenes in which $R_1$ is

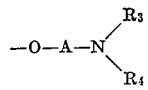

(wherein $R_3$, $R_4$ and A have the significance hereinbefore defined) can be prepared by etherification of the corresponding halophenol with the appropriate tertiaryaminoalkyl halide

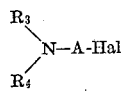

wherein $R_3$, $R_4$, A, and Hal have the significance above defined. The etherification is conducted advantageously in an inert solvent such as a lower-alkanol, for example, methanol, ethanol, isopropyl alcohol, and the like, in the presence of a base such as sodium hydroxide, sodium methoxide, and the like.

The tertiaryaminoalkyl halides having the formula

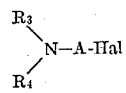

can themselves be prepared by halogenation of the corresponding tertiaryaminoalkanols, which tertiaryaminoalkanols in turn can be made by interaction of the requisite secondary amine

with the appropriate haloalkanol, Hal—A—OH, wherein Hal and A have the significance hereinbefore defined, in accordance with known methods. The condensation between the secondary amine

and the haloalkanol Hal—A—OH can be carried out, for example, using the procedure described by Moffett, J. Org. Chem. 14, 862, 1949. Alternatively, the desired tertiaryaminoalkanols can be prepared by heating the secondary amine

with the appropriate haloalkanoic acid ester, followed by reduction of the thus-produced aminoalkanoic acid ester with lithium aluminum hydride according to the method described by Moffett, supra.

The conversion of the tertiaryaminoalkanols so obtained to the corresponding tertiaryaminoalkyl halides can be carried out by the use of known halogenating agents such as thionyl bromide, thionyl chloride, phosphorus tribromide, phosphorus trichloride, and the like, using, for example, the procedure described by Moffett et al., J. Am. Chem. Soc., 77, 1565, 1955.

The ketones having the Formula II above which are employed as starting materials in the preparation of the compounds of the invention having the Formula I, can be prepared according to the procedure set forth below:

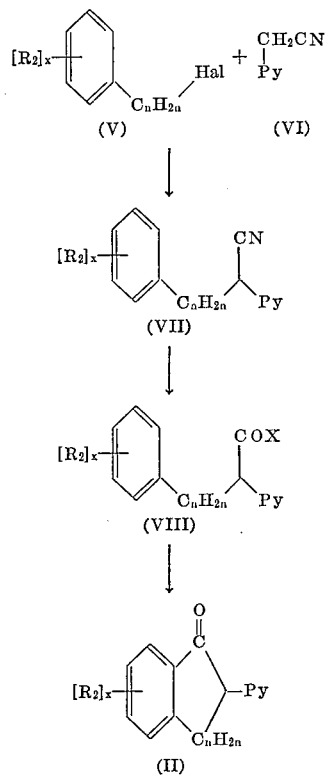

In the above formulae, $R_2$, $x$, —$C_nH_{2n}$—, Hal, and Py have the significance hereinbefore defined and X is selected from the class consisting of OH, $NH_2$, OAlkyl, and Hal.

In the above process the appropriately substituted phenylalkyl halide (V) is condensed with an alkali metal derivative of the appropriate pyridineacetonitrile (VI) (prepared by reacting the latter with an alkali metal hydride such as sodium hydride, potassium hydride, or lithium hydride) in the presence of an inert organic solvent such as benzene, toluene, xylene, mineral oil (high boiling liquid paraffinic hydrocarbons), N,N-dialkylformamides such as N,N-dimethylformamide, N,N-diethylformamide, and the like. The reaction is preferably conducted at room temperature (approximately 25° C.) or slightly below. The reactants are preferably employed in approximately stoichiometric proportion in order to obtain optimum yields of reaction product but other proportions of reactants can be employed if desired.

The desired compound (VII) can be isolated from the reaction mixture by conventional procedures, for example, by filtering the reaction mixture, extracting the filtrate with dilute aqueous mineral acid followed by basification of the acid extract, whereby the compound (VII) is precipitated. The compound (VII) so obtained can be purified, if desired, by conventional procedures such as recrystallization, distillation, and the like.

The nitrile (VII) so obtained is then converted to the corresponding carboxylic acid (VIII) or derivative thereof. Thus, the nitrile (VII) can be partially hydrolyzed, for example, using aqueous alcoholic sodium hydroxide or like alkali metal hydroxide, to the corresponding amide (VIII; $X=NH_2$). Alternatively, the nitrile (VII) can be hydrolyzed using, for example, aqueous mineral acid such as hydrochloric, sulfuric, and like acids or using aqueous alkali such as sodium hydroxide, potassium hydroxide, and the like, to obtain the free carboxylic acid (VIII; $X=OH$). If desired, the acid so obtained can be converted to the corresponding ester (VIII; $X=OAlkyl$) by reaction with a lower-alkanol under conditions well known in the art for the preparation of esters of carboxylic acids. Alternatively, the free carboxylic acid can be converted to the corresponding acid halide by reaction with the appropriate agent such as phosphorus oxychloride, phosphorus oxybromide, thionyl chloride, and the like, under conditions conventional in the art for the preparation of acid halides.

The free carboxylic acid (VIII; $X=OH$) or any of its functional derivatives, i.e., the corresponding amide, ester or halide prepared as described above can be cyclized to yield the desired ketone (II). The cyclization is accomplished by treating the compound (VIII) with a Lewis acid according to procedures well known in the art for such cyclizations; see, for example, Fieser and Hershberg, J. Am. Chem. Soc. 61, 1272, 1939. The term "Lewis acid" is well known in the art and is defined succinctly by Fieser and Fieser, "Organic Chemistry," Third Edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like.

A particularly convenient cyclizing agent for use in the above process is polyphosphoric acid. Using this cyclizing agent the compound (VIII) is treated with an excess of cyclizing agent at elevated temperatures, suitably from about 100° C. to about 150° C., for a short period, of the order of minutes, until cyclization is complete. The desired product (II) is isolated from the reaction mixture by conventional procedures, for example, by pouring the reaction mixture into water, neutralizing the resulting suspension, isolating the insoluble material, and purifying by recrystallization and like procedures.

The above reaction procedure can be used, with modification when necessary, for effecting cyclization of compound (VIII) using other cyclizing agents such as those set forth above. The reaction temperature is suitably lowered when the cyclizing agent is highly volatile. For example, when hydrogen fluoride is employed as cyclizing agent the compound (VIII) is dissolved in liquid hydrogen fluoride with stirring and the hydrogen fluoride is then allowed to evaporate at room temperature.

The phenylalkyl halides (V), which are employed as starting materials in the process described above for the preparation of the ketones (II), can themselves be prepared by conventional procedures. For example, the benzyl halides, i.e., the compounds (V) wherein —$C_nH_{2n}$— is methylene can be prepared from the correspondingly substituted benzoic acids, for example, by reduction of said acids or simple alkyl esters thereof with lithium aluminum hydride according to the procedure described by Nystrom and Brown, J. Am. Chem. Soc. 69, 2548, 1947. The benzyl alcohols so obtained are then converted to the corresponding benzyl halides using procedures known in the art, for example, that described by Gilman and Kirby, J. Am. Chem. Soc. 51, 475, 1929.

The phenylalkyl halides (V) wherein —$C_nH_{2n}$— is

can be obtained by reduction of the appropriate alkanophenone

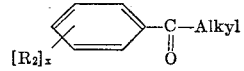

wherein $R_2$ and $x$ have the significance hereinbefore defined, using, for example, sodium in alcohol, followed by halogenation of the phenylalkylcarbinol so obtained, using, for example, a hydrogen halide as described by Kharasch and Kleiman, J. Am. Chem. Soc., 65, 11, 1943, or using, for example, a phosphorus oxyhalide as described by Gerrard, J. Chem. Soc., 1945, 106.

The phenylalkyl halides (V) wherein —$C_nH_{2n}$— is

can be obtained by reaction of the appropriate alkanophenone of the above formula with the appropriate alkylmagnesium halide under conditions conventional in the art for carrying out Grignard reactions, and conversion of the tertiary carbinol so obtained to the corresponding halide by the processes enumerated above.

The phenylalkyl halides (V) wherein —$C_nH_{2n}$— represents

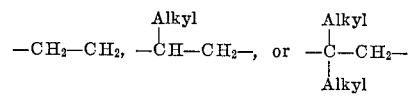

can be prepared by reacting the appropriate benzyl, α-alkylbenzyl, or α,α-dialkybenzyl halide, prepared as described above, with an alkali metal cyanide, suitably potassium cyanide, sodium cyanide, or the like, to form the corresponding nitrile, hydrolyzing the latter using aqueous mineral acid to form the corresponding phenylacetic acid, reducing the latter compound using the conditions set forth above for the reduction of the corresponding benzoic acids, and converting the substituted phenethyl alcohol so obtained to the corresponding halide.

The phenylalkyl halides (V) wherein —$C_nH_{2n}$— represents

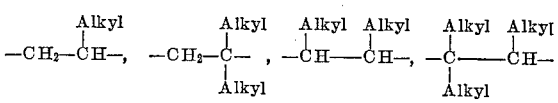

or

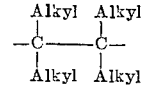

can be obtained from the appropriately substituted phenylacetone

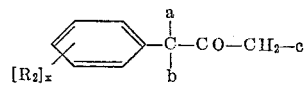

wherein $R_2$ and $x$ are as hereinbefore defined and $a$, $b$, and $c$ represent hydrogen or lower-alkyl, using procedures analogous to those described above for the preparation of α-alkylbenzyl and α,α-diaalkylbenzyl halides.

Similarly, the phenylalkyl halides (V) wherein
—$C_nH_{2n}$—
represents

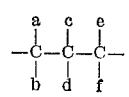

wherein a, b, c, d, e, and f are selected from the class consisting of hydrogen and lower-alkyl, can be prepared from the corresponding substituted β-phenylethyl halides or from the corresponding ketones

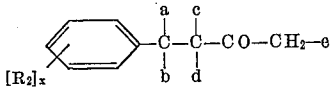

wherein $R_2$, x, a, b, c, d, and e have the significance hereinbefore defined, using procedures corresponding to those set forth above for the preparation of the corresponding benzyl and phenethyl halides.

The pyridineacetonitriles having the Formula VI are for the most part known compounds. In general, they can be prepared as follows. The appropriate acetylpyridine is converted via its thioacetmorpholide to the corresponding pyridineacetic acid using the procedure described by Malan et al., J. Am. Chem. Soc., 69, 1797, 1947. The acid so obtained is converted to the corresponding amide by conventional procedures and the amide is dehydrated using phosphorus pentoxide under the conditions described by Sperber et al., J. Am. Chem. Soc., 73, 5752, 1951, for the conversion of 3-pyridineacetamide to 3-pyridineacetonitrile.

The compounds of the invention having the Formula I in which $R_1$ represents

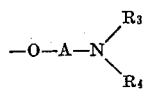

wherein A, $R_3$, and $R_4$ have the significance above defined, can, in addition to the methods of synthesis described above, also be prepared from the corresponding compounds wherein $R_1$ represents hydroxy by reaction of the latter compounds with the appropriate tertiaryaminoalkyl halide

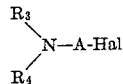

wherein $R_2$, $R_4$, A, and Hal have the significance above defined. The etherification conditions are those described above for the preparation of the halobenzenes

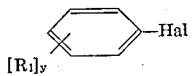

wherein $R_1$ is

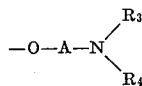

The acid addition salts of the compounds of the invention having the Formula I can be prepared by methods well known in the art. For example, the acid addition salts of the invention can be prepared by reacting a free base having the Formula I with a pharmacologically acceptable acid, as hereinbefore exemplified, in the presence of an inert solvent such as methanol, ethanol, diethyl ether, ethyl acetate, and the like.

The quaternary ammonium salts of the invention can be prepared by reacting a free base of the Formula I with a quaternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzyl bromide, benzhydryl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumerated previously, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The following preparations and examples illustrate the best method contemplated by the inventor for carrying out his invention, but are not to be construed as limiting the scope thereof.

PREPARATION 1 p-(2-diethylaminoethoxy)bromobenzene

A mixture of 272 g. (1.57 moles) of p-bromophenol, 1500 ml. of ethanol, and 340 g. (equivalent to 1.57 moles of sodium methoxide) of a 25% solution of sodium methoxide in methanol was stirred and heated under reflux and to the refluxing solution was added dropwise, over a period of 30 minutes, a solution of 213 g. of 2-diethylaminoethyl chloride in 200 ml. of ethanol. After the addition was complete, the mixture was stirred and heated under reflux for a further 3 hours. At the end of this time the reaction mixture was cooled and filtered, and the filtrate was evaporated under reduced pressure. The residual oil was dissolved in 1500 ml. of ether and the ether solution was washed with two 200-ml. portions of dilute aqueous sodium hydroxide solution and then with four 200-ml. portions of water. The ethereal solution was dried over anhydrous magnesium sulfate, and the filtrate was evaporated. The residue was distilled under reduced pressure and that fraction having a boiling point of 110 to 115° C. at a pressure of 0.3 mm. of mercury was collected. There was thus obtained 310 g. of p-(2-diethylaminoethoxy)bromobenzene in the form of an oil. The free base so obtained was converted to the hydrochloride having a melting point of 139 to 140° C.

Analysis.—Calcd. for $C_{12}H_{19}BrClNO$: C, 46.69; H, 6.20; N, 4.54. Found: C, 47.04; H, 6.47; N, 4.49.

Using the above procedure, but replacing the 2-diethylaminoethyl chloride by 3-dimethylaminopropyl chloride, 2-diethylaminopropyl chloride, 2-dibutylaminoethyl bromide, 2-methylethylaminoethyl bromide, 3-diethylaminobutyl chloride, 5-dimethylaminopentyl bromide, 2-diethylaminopentyl bromide, 6-dimethylaminohexyl chloride, 2-pyrrolidinoethyl chloride, 3 - (2,2 - dimethylpyrrolidino)propyl bromide, 2-piperidinoethyl chloride, 2-piperidinopropyl bromide, 2-morpholinoethyl chloride, 2-morpholinobutyl bromide, 1-methyl-4-(2-chloroethyl)piperazine, 2-hexamethyleneiminoethyl chloride, 2-homopiperazinoethyl chloride, and 2-homomorpholinoethyl chloride, there are obtained p-(3 - dimethylaminopropoxy)bromobenzene, p-(2-diethylaminopropoxy)bromobenzene, p-(2-dibutylaminoethoxy)bromobenzene, p-(2 - N - methyl-N-ethylaminoethoxy)bromobenzene, p - (3 - diethylaminobutoxy)bromobenzene, p - (5 - dimethylaminopentoxy)-bromobenzene, p - (2 - diethylaminopentoxy)bromobenzene, p-(6-dimethylaminohexyloxy)bromobenzene, p-(2-pyrrolidinoethoxy)bromobenzene, p-[3-(2,2-dimethylpyrrolidino)propoxy]bromobenzene, p - (2 - piperidinoethoxy)bromobenzene, p - (2-piperidinopropoxy) bromobenzene, p - (2 - morpholinoethoxy)bromobenzene, p-(2-morpholinobutoxy)bromobenzene, p - [2 - (1'-methyl-4'-piperazino)ethoxy]bromobenzene, p - (2 - hexamethyleniminoethoxy)bromobenzene, p - (2 - homopiperazinoethoxy)bromobenzene, and p-(2-homomorpholinoethoxy)-bromobenzene, respectively.

Using the above procedure, but replacing p-bromophenol by o-bromophenol and m-bromophenol, the cor-

PREPARATION 2

α-(m-methoxyphenylethyl)-3-pyridineacetonitrile

To a solution of 43.8 g. of 3-pyridineacetonitrile in 230 ml. of dimethylformamide was added in small portions a total of 17.2 g. of a 53% w./w. suspension of sodium hydride in mineral oil. When the effervescence in the resulting mixture had ceased, the latter was cooled in ice and a solution of 79.05 g. of m-methoxy-β-phenylethyl bromide in 230 ml. of toluene was added. The mixture so obtained was stirred and maintained at approximately 25° C. overnight. The solid which had separated was removed by filtration and the filtrate was concentrated under reduced pressure to approximately 100 ml. The concentrate was treated with a mixture of ether and water. The organic layer was separated, washed with water, and extracted with four 100-ml. portions of 2.5 N hydrochloric acid. The acid extract was made basic by the addition of a slight excess of 25% aqueous sodium hydroxide solution. The oil which separated was extracted with ether and the etheral extract was washed with water before being dried over anhydrous sodium sulfate. The dried solution was filtered and the filtrate was evaporated to dryness. The residual oil was distilled under high vacuum to yield 59.84 g. of α-(m-methoxyphenylethyl)-3-pyridineacetonitrile in the form of a viscous oil having a boiling point of 178 to 183° C. at a pressure of 0.5 mm. of mercury.

Using the above procedure, but replacing 3-pyridineacetonitrile as starting material by 2-pyridineacetonitrile, 4-pyridineacetonitrile, 2-methyl-3-pyridineacetonitrile, 5-methyl-2-pyridineacetonitrile, 6 - methyl-2-pyridineacetonitrile, 2-chloro-3-pyridineacetonitrile, and 6-ethoxy-2-pyridineacetonitrile, there are obtained:

α-(m-methoxyphenylethyl)-2-pyridineacetonitrile,
α-(m-methoxyphenylethyl)-4-pyridineacetonitrile,
α-(m - methoxyphenylethyl)-2-methyl-3-pyridineacetonitrile,
α-(m - methoxyphenylethyl)-5-methyl-2-pyridineacetonitrile,
α-(m - methoxyphenylethyl)-6-methyl-2-pyridineacetonitrile,
α-(m - methoxyphenylethyl) - 2-chloro-3-pyridineacetonitrile, and
α-(m-methoxyphenylethyl) - 6 - ethoxy-2-pyridineacetonitrile, respectively.

PREPARATION 3

α-(m-methoxyphenylethyl)-3-pyridineacetamide

To a solution of 59.84 g. of α-(m-methoxyphenylethyl)-3-pyridineacetonitrile in 400 ml. of ethanol there was added 105 ml. of 30% hydrogen peroxide. The resulting mixture was stirred and treated, over a period of 5 minutes, with 10.5 ml. of 24% aqueous sodium hydroxide solution. The mixture so obtained was then heated at 50 to 60° C. for 3 hours before being concentrated to about ⅓ volume by distillation under reduced pressure. The concentrate was diluted to 1 liter with water and the solid which separated was isolated by filtration and washed on the filter with water. The residue was recrystallized from acetone. There was thus obtained 39.62 g. of α-(m-methoxyphenylethyl)-3-pyridineacetamide in the form of a crystalline solid having a melting point of 150 to 154° C. An analytical sample having a melting point of 156 to 157° C. was obtained by further recrystallization from acetone.

*Analysis.*—Calcd. for $C_{16}H_{18}N_2O_2$: C, 71.09; H, 6.71; N, 10.36. Found: C, 71.22; H, 6.82; N, 10.10.

Using the above procedure, but replacing α-(m-methoxyphenylethyl)-3-pyridineacetonitrile by α-(m-methoxyphenylethyl)-2-pyridineacetonitrile, α-(m-methoxyphenylethyl)-4-pyridineacetonitrile, α-(m-methoxyphenylethyl)-2-methyl - 3 - pyridineacetonitrile, α-(m-methoxyphenylethyl) - 5-methyl-2-pyridineacetonitrile, α - (m-methoxyphenylethyl)-6-methyl-2-pyridineacetonitrile, α-(m-methoxyphenylethyl) - 2-chloro-3-pyridineacetonitrile, and α-(m-methoxyphenylethyl) - 6-ethoxy-2-pyridineacetonitrile, there are obtained:

α-(m-methoxyphenylethyl)-2-pyridineacetamide,
α-(m-methoxyphenylethyl)-4-pyridineacetamide,
α-(m-methoxyphenylethyl)-2-methyl-3-pyridineacetamide,
α-(m-methoxyphenylethyl)-5-methyl-2-pyridineacetamide,
α-(m-methoxyphenylethyl)-6-methyl-2-pyridineacetamide,
α-(m-methoxyphenylethyl)-2-chloro-3-pyridinetacetamide, and
α-(m-methoxyphenylethyl)-6-ethoxy-2-pyridinetacetamide, respectively.

PREPARATION 4

3,4-dihydro-6-methoxy-2-(3-pyridyl)1(2H)-naphthalenone

A total of 39.62 g. of α-(m-methoxyphenylethyl)-3-pyridineacetamide was added portionwise over a period of 5 minutes to 200 g. of well-stirred polyphosphoric acid maintained at 135° C. The temperature was maintained at 125 to 130° C. for 25 minutes and the resulting dark mixture was poured onto a mixture of ice and water. The solution so obtained was neutralized by the addition of 25% aqueous sodium hydroxide solution and the pH of the mixture was then adjusted to 8.0 by the addition of aqueous sodium carbonate solution. The solid which separated was isolated by filtration, washed with water, and recrystallized from aqueous methanol. There was thus obtained 19.22 g. of 3,4-dihydro-6-methoxy-2-(3-pyridyl)-1-(2H)-naphthalenone hemihydrate in the form of a crystalline solid having a melting point of 85 to 89° C. An analytical sample having a melting point of 91 to 93.5° C. was obtained by further recrystallization from aqueous methanol.

*Analysis.*—Calcd. for $C_{16}H_{15}NO_2 \cdot \frac{1}{2}H_2O$: C, 73.26; H, 6.10; N, 5.34. Found: C, 73.37; H, 6.26; N, 5.42.

Using the above procedure, but replacing α-(m-methoxyphenylethyl)-3-pyridineacetamide by α-(m-methoxyphenylethyl)-2-pyridineacetamide,
α-(m-methoxyphenylethyl)-4-pyridineacetamide,
α-(m-methoxyphenylethyl)-2-methyl-3-pyridineacetamide,
α-(m-methoxyphenylethyl)-5-methyl-2-pyridineacetamide,
α-(m-methoxyphenylethyl)-6-methyl-2-pyridineacetamide,
α-(m-methoxyphenylethyl)-2-chloro-3-pyridineacetamide, and
α-(m-methoxyphenylethyl)-6-ethoxy-2-pyridineacetamide, there are obtained:

3,4-dihydro-6-methoxy-2-(2-pyridyl)-,
3,4-dihydro-6-methoxy-2-(4-pyridyl)-,
3,4-dihydro-6-methoxy-2-(2-methyl-3-pyridyl)-,
3,4-dihydro-6-methoxy-2-(5-methyl-2-pyridyl)-,
3,4-dihydro-6-methoxy-2-(6-methyl-2-pyridyl)-,
3,4-dihydro-6-methoxy-2-(2-chloro-3-pyridyl)-, and
3,4-dihydro-6-methoxy-2-(6-ethoxy-2-pyridyl)-1(2H)-naphthalenones, respectively.

PREPARATION 5

2-(3-pyridyl)-6-bromo-1-indanone

Using the procedure described in Preparation 2, but replacing m-methoxy-β-phenylethyl bromide by 4-bromobenzyl chloride, there is obtained α-(4-bromobenzyl)-3-pyridineacetonitrile. The latter compound is then converted by the procedure described in Preparation 3 to α-(4-bromobenzyl)-3-pyridineacetamide, and the latter is cyclized using the procedure described in Preparation 4 to yield 2-(3-pyridyl)-6-bromo-1-indanone.

Using the above procedure, but replacing 4-bromobenzyl chloride employed as starting material by 4-chlorobenzyl bromide, 3-methoxybenzyl chloride, 3,4-methylenedioxybenzyl bromide, 4-t-butylbenzyl bromide, α-methylbenzyl chloride, α-propylbenzyl chloride, 2-allyl-4,5-methylenedioxybenzyl chloride, and 4-trifluoromethylbenzyl chloride, there are obtained 2-(3-pyridyl)-6-chloro-, 2-(3-pyridyl) - 5 - methoxy-, 2-(3-pyridyl)-5,6-methylenedioxy-, 2-(3-pyridyl)-6-t-butyl-, 2-(3-pyridyl)-3-methyl-, 2-(3-pyridyl) - 3 - propyl-, 2-(3-pyridyl)-4-allyl-6,7-methylenedioxy-, and 2-(3-pyridyl)-6-trifluoromethyl-1-indanones, respectively.

PREPARATION 6

*3,4-dihydro-5-chloro-2-(3-pyridyl)-1(2H)-napthalenone*

Using the procedure described in Preparation 2, but replacing m-methoxy-β-phenylethyl bromide by 2-chloro-β-phenylethyl bromide, there is obtained α-(2-chloro-phenylethyl)-3-pyridineacetonitrile. The latter compound is then converted by the procedure described in Preparation 3 to α-(2-chlorophenylethyl)-3-pyridineacetamide, and the latter is cyclized using the procedure described in Preparation 4 to yield 3,4-dihydro-5-chloro-2-(3-pyridyl-1(2H)-naphthalenone.

Using the above procedure, but replacing 2-chloro-β-phenylethyl bromide by 3,4-methylenedioxy-β-phenylethyl bromide, 1-phenyl-2-chloropropane, and 1-bromo-2-phenyl-2-methylpropane, there are obtained 3,4-dihydro-6,7-methylenedioxy-, 3,4-dihydro-3-methyl-, and 3,4-dihydro-4,4-dimethyl-2 - (3-pyridyl) - 1(2H)-naphthalenones, respectively.

PREPARATION 7

*6-(3-pyridyl)-6,7,8,9-tetrahydro-5H-benzocycloheptene-5-one*

Using the procedure described in Preparation 2, but replacing m-methoxy-β-phenylethyl bromide by γ-phenylpropyl bromide, there is obtained α-(γ-phenylpropyl)-3-pyridineacetonitrile. The latter compound is then converted by the procedure described in Preparation 3 to α-(γ-phenylpropyl)-3-pyridineacetamide, and the latter is cyclized using the procedure described in Preparation 4 to yield 6-(3-pyridyl)-6,7,8,9-tetrahydro-5H-benzocycloheptene-5-one having the structural formula:

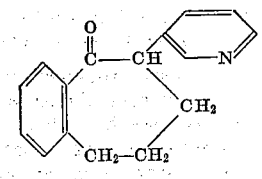

Using the above procedure, but replacing γ-phenylpropyl bromide as starting material by 4-bromo-2-phenylpentane, there is obtained 7,9-dimethyl-6-(3-pyridyl)-6,7,8,9-tetrahydro-5H-benzocycloheptene-5-one.

PREPARATION 8

*o-allyloxybenzyl chloride*

To a solution of 25 g. of o-allyloxybenzyl alcohol in 100 ml. of dry toluene is added slowly with stirring, a total of 25 g. of thionyl chloride. After the initial reaction has subsided the resulting mixture is heated under reflux until evolution of gas ceases. The mixture so obtained is distilled to remove the solvent and excess thionyl chloride and the residue is distilled under reduced pressure. There is thus obtained o-allyloxybenzyl chloride.

Using the above procedure, but replacing o-allyloxybenzyl alcohol by 3-chloro-α-ethyl-4-methylthiobenzyl alcohol, 3-diethylaminobenzyl alcohol, 4-dimethylaminobenzyl alcohol, and o-(3-methyl-1-pyrrolidinyl)benzyl alcohol, there are obtained the correspondingly substituted benzyl chlorides.

PREPARATION 9

*p-cyclohexyloxybenzyl chloride*

To a solution of 0.1 mole of lithium aluminum hydride in 180 ml. of ether is added slowly, with stirring and cooling, a solution of 0.09 mole of p-cyclohexyloxybenzoic acid in 150 ml. of ether. When the addition is complete the resulting mixture is stirred for a short period before water is added cautiously to decompose the excess hydride. The mixture so obtained is treated with an excess of aqueous sulfuric acid and the organic layer is separated, washed with water, and dried over anhydrous sodium sulfate. The dried solution is evaporated to dryness and the residue is distilled under reduced pressure. There is thus obtained p-cyclohexyloxybenzyl alcohol which is then converted to the corresponding chloride using the procedure set forth in Preparation 8.

PREPARATION 10

*2-(3-pyridyl)-4-allyloxy-1-indanone*

Using the procedure described in Preparation 2, but replacing m-methoxy-β-phenylethyl bromide by o-allyloxybenzyl chloride, there is obtained α-(o-allyloxybenzyl)-3-pyridineacetonitrile. The latter compound is then converted by the procedure described in Preparation 3 to α-(o-allyloxybenzyl)-3-pyridineacetamide, and the latter is cyclized using the procedure described in Preparation 4 to yield 2-(3-pyridyl)-4-allyloxy-1-indanone.

Using the above procedure, but replacing o-allyloxybenzyl chloride employed as starting material by 3-chloro-α-ethyl-4-methylthiobenzyl chloride, 3-diethylaminobenzyl chloride, 4-dimethylaminobenzyl chloride, o-(3-methyl-1-pyrrolidinyl)benzyl chloride, and p - cyclohexylbenzyl chloride, there are obtained 2-(3-pyridyl)-3-ethyl-5-chloro-6-methylthio-1-indanone, 2-(3-pyridyl)-5-diethylamino-1-indanone, 2-(3-pyridyl) - 6 - dimethylamino-1-indanone, 2-(3-pyridyl)-4-(3-methyl - 1 - pyrrolidinyl)-1-indanone, and 2-(3-pyridyl)-6-cyclohexyloxy-1-indanone, respectively.

EXAMPLE 1

*1-(p-methoxyphenyl)-2-(3-pyridyl)-6-methoxy-3,4-dihydronaphthalene and the hydrochloride thereof*

A solution of 4.0 g. of 3,4-dihydro-6-methoxy-2-(3-pyridyl)-1(2H)-naphthalenone in 40 ml. of tetrahydrofuran was added to an ice-cooled solution of the Grignard reagent prepared from 15.0 g. of p-bromoanisole and 1.95 g. of magnesium in 100 ml. of tetrahydrofuran. The resulting mixture was heated for 17 hours under reflux before being allowed to cool. The mixture so obtained was decomposed by the careful addition of water and the insoluble material was removed by filtration. The filtrate was evaporated to dryness and the residue was dissolved in ether. The ether extract was extracted with excess 2.5 N hydrochloric acid. The acid extract was made basic by the addition of aqueous sodium hydroxide solution and the resulting solution was extracted with ether. The ether extract was washed with water and then with saturated sodium chloride solution before being dried over anhydrous sodium sulfate and evaporated to dryness. The residue was dissolved in 40 ml. of tetrahydrofuran and again submitted to the Grignard reaction using the conditions described above. The residue obtained by working up the reaction mixture as described above was dissolved in ether and the ethereal solution was extracted with 2.5 N hydrochloric acid. The acid extract was extracted with methylene chloride and the methylene chloride extract was dried and evaporated to dryness. The residue was recrystallized four times from a mixture of methylene chloride and ethyl acetate. There was thus obtained 1.44 g. of 1-(p-methoxyphenyl)-2-(3-pyridyl)-6-methoxy-3,4-dihydronaphthalene hydrochloride in the form of a crystalline solid having a melting point of 230 to 232° C.

Analysis.—Calcd. for $C_{23}H_{22}ClNO_2$: C, 72.72; N, 5.84; N, 3.69. Found: C, 71.76; H, 5.52; N, 3.60.

A solution of 1 g. of the above hydrochloride in water is made basic by the addition of a slight excess of aqueous sodium hydroxide solution. The basic solution is extracted with ether, washed with water, and dried over anhydrous sodium sulfate. The dried solution is filtered and the filtrate is evaporated to dryness. The residue is recrystallized from aqueous ethanol to obtain 1-(p-methoxyphenyl)-2-(3-pyridyl)-6-methoxy - 3,4 - dihydronaphthalene in the form of a crystalline solid.

EXAMPLE 2

*1-(p-hydroxyphenyl)-2-(3-pyridyl)-6-methoxy-3,4-dihydronaphthalene*

A solution of 4.0 g. of 3,4-dihydro-6-methoxy-2-(3-pyridyl)-1(2H)-naphthalenone in 40 ml. of tetrahydrofuran was added slowly with stirring to the Grignard reagent prepared from 20.5 g. of p-(2-tetrahydropyranyloxy)bromobenzene and 1.95 g. of magnesium in 200 ml. of tetrahydrofuran. The resulting mixture was heated under reflux for 17 hours before being allowed to cool. The mixture so obtained was decomposed by the careful addition of water and the insoluble material was removed by filtration. The filtrate was washed with water and then with saturated sodium chloride solution before being dried and evaporated to dryness. The residue was taken up in 40 ml. of tetrahydrofuran and again subjected to the Grignard reaction using the reaction procedure described above. The residue obtained by working up the reaction mixture as before was dissolved in ether and the ethereal solution was extracted with excess 2.5 N hydrochloric acid. The acid extract was stirred for 2 hours at approximately 25° C. and then made strongly alkaline by the addition of 50% aqueous sodium hydroxide solution and extracted with ether. The aqueous layer was then adjusted to pH 8 by the addition of solid carbon dioxide and was extracted with a mixture of ether and methylene chloride. The organic extracts were dried and evaporated to dryness and the residue was recrystallized from methanol. There was thus obtained 1.0 g. of 1-(p-hydroxyphenyl)-2-(3-pyridyl)-6-methoxy - 3,4 - dihydronaphthalene in the form of a crystalline solid having a melting point of 205 to 212° C. An analytical sample having a melting point of 228 to 230° C. was obtained by recrystallization from aqueous ethanol.

*Analysis.*—Calcd. for $C_{22}H_{19}NO_2$: C, 80.22; H, 5.81; N, 4.25. Found: C, 79.46; H, 6.33; N, 4.48.

EXAMPLE 3

*1-phenyl-2-(3-pyridyl)-6-methoxy-3,4-dihydronaphthalene*

A solution of 4.0 g. of 3,4-dihydro-6-methoxy-2-(3-pyridyl)-1(2H)-naphthalenone in 40 ml. of tetrahydrofuran was added slowly with stirring and cooling to a solution of the Grignard reagent prepared from 12.5 g. of bromobenzene and 1.95 g. of magnesium in 100 ml. of tetrahydrofuran. The resulting mixture was heated under reflux for 17 hours before being cooled and decomposed by the careful addition of water. The mixture so obtained was filtered and the filtrate was diluted with ether and then washed with water and with saturated sodium chloride solution. The organic layer was then dried and evaporated to dryness. The residue was recrystallized once from methanol and twice from aqueous methanol. There was thus obtained 1.75 g. of 1-phenyl-2-(3-pyridyl) - 6 - methoxy - 1,2,3,4 - tetrahydro - 1 - naphthol in the form of a crystalline solid having a melting point of 207 to 209° C.

*Analysis.*— Calcd. for $C_{22}H_{21}NO_2$: C, 79.73; H, 6.39; N, 4.22. Found: C, 79.25; H, 6.85; N, 4.17.

One-half gram of the above compound is heated under a gentle stream of nitrogen in an oil bath at 200 to 210° C. until no more effervescence occurs. The residue is recrystallized to obtain 1 - phenyl - 2 - (3 - pyridyl)-6-methoxy-3,4-dihydronaphthalene in the form of a crystalline solid.

EXAMPLE 4

*2-[p-(2-diethylaminoethoxy)phenyl]-2-(3-pyridyl)-6-methoxy-3,4-dihydronaphthalene dihydrochloride*

To a solution of 0.78 g. of 1-(p-hydroxyphenyl)-2-(3-pyridyl)-6-methoxy-3,4-dihydonaphthalene in 9 ml. of dimethylformamide was added 0.12 g. of 53% by weight suspension of sodium hydride in mineral oil. When the effervescence had ceased 0.71 g. of a 1:1 suspension of 2-diethylaminoethyl chloride in toluene was added followed by 50 ml. of benzene. The resulting mixture was heated for 24 hours under reflux and then allowed to cool. The cooled solution was diluted with ether and washed with water followed by a 5% aqueous solution of sodium hydroxide. The organic layer was extracted three times with 20 ml. of 2.5 N hydrochloric acid and the aqueous acid extracts were washed with ten 50-ml. portions of chloroform. The combined chloroform extracts were evaporated to dryness and the residue was recrystallized from a mixture of methanol and acetone. There was thus obtained 0.85 g. of 1 - [p - (2 - diethylaminoethoxy)phenyl] - 2 - (3 - pyridyl - 6 - methoxy-3,4-dihydronaphthalene dihydrochloride in the form of a crystalline solid having a melting point of 270 to 271° C. (with decomposition).

*Analysis.*—Calcd. for $C_{28}H_{34}Cl_2N_2O_2$: C, 66.25; H, 7.00; Cl, 14.11; N, 5.58. Found: C, 66.96; H, 7.22; Cl, 14.32; N, 5.45.

EXAMPLE 5

*1 - [p - (2 - diethylaminoethoxy)phenyl] - 2 - (3 - pyridyl) - 6 - methoxy - 3,4 - dihydronaphthalene and the dihydrochloride thereof*

Using the procedure described in Example 1, but replacing the Grignard reagent obtained from p-bromoanisole by the Grignard reagent obtained from p-(2-diethylaminoethoxy)bromobenzene, there is obtained 1-[p-(2 - diethylaminoethoxy)phenyl] - 2 - (3 - pyridyl - 6-methoxy - 3,4 - dihydronaphthalene and the dihydrochloride thereof, the latter being identical to the material obtained as described in Example 4.

Similarly, using the procedure described in Example 1, but replacing the Grignard reagent obtained from p-bromoanisole by the Grignard reagent obtained from p-(3-dimethylaminopropoxy)bromobenzene,
p-(2-diethylaminopropoxy)bromobenzene,
p-(2-N-methyl-N-ethylaminoethoxy)bromobenzene,
p-(5-dimethylaminopentoxy)bromobenzene,
p-(6-dimethylaminohexyloxy)bromobenzene,
p-(2-pyrrolidinoethoxy)bromobenzene,
p-[3-(2,2-dimethylpyrrolidino)propoxyl]bromobenzene,
p-(2-piperidinoethoxy)bromobenzene,
p-(2-morpholinoethoxy)bromobenzene,
p-[2-(1'-methyl-4'-piperazino)ethoxy]bromobenzene,
p-(2-hexamethyleniminoethoxy)bromobenzene,
p-(2-homopiperazinoethoxy)bromobenzene, and
p-(2-homomorpholinoethoxy)bromobenzene, there are obtained:

1-[p-(3-dimethylaminopropoxy)phenyl]-,
1-[p-(2-diethylaminopropoxy)phenyl]-,
1-[p-2-N-methyl-N-ethylaminoethoxy)phenyl]-,
1-[p-(5-dimethylaminopentoxy)phenyl]-,
1-[p-(6-dimethylaminohexyloxy)phenyl]-,
1-[p-(2-pyrrolidinoethoxy)phenyl]-,
1-[p-3-(2,2-dimethylpyrrolidino)propoxyphenyl]-,
1-[p-(2-piperidinoethoxy)phenyl]-,
1-[p-(2-morpholinoethoxy)phenyl]-,
1-{p-[2-(1'-methyl-4'-piperazino)ethoxy]phenyl}-,
1-[p-(2-hexamethyleniminoethoxy)phenyl]-,
1-[p-(2-homopiperazinoethoxy)phenyl]-, and
1 - [p - (2 - homomorpholinoethoxy)phenyl] - 2 - (3-pyridyl) - 6 - methoxy - 3,4 - dihydronapthalenes and the dihydrochlorides thereof.

EXAMPLE 6

*1 - (p - methoxyphenyl) - 2 - (2 - pyridyl) - 6 - methoxy-3,4 - dihydronaphthalene and the hydrochloride thereof*

Using the procedure described in Example 1, but replacing 3,4 - dihydro - 6 - methoxy - 2 - (3 - pyridyl)-1(2H) - naphthalenone by 3,4 - dihydro - 6 - methoxy-2-(2-pyridyl)-1(2H)naphthalenone, there are obtained 1 - (p - methoxyphenyl) - 2 - (2 - pyridyl) - 6 - methoxy-3,4-dihydro-naphthalene and the hydrochloride thereof.

EXAMPLE 7

*1 - (p - methoxyphenyl) - 2 - (4 - pyridyl) - 6 - methoxy-3,4-dihydronaphthalene and the hydrochloride thereof*

Using the procedure described in Example 1, but replacing 3,4 - dihydro - 6 - methoxy - 2 - (3 - pyridyl)-1(2H) - naphthalenone by 3,4 - dihydro - 6 - methoxy-2 - (4 - pyridyl) - 1(2H) - naphthalenone, there are obtained 1 - (p - methoxyphenyl) - 2 - (4 - pyridyl) - 6 - methoxy-3,4-dihydronaphthalene and the hydrochloride thereof.

EXAMPLE 8

*1 - (p - methoxyphenyl) - 2 - (2 - methyl - 3 - pyridyl)-6 -methoxy - 3,4 - dihydronaphthalene and the hydrochloride thereof*

Using the procedure described in Example 1, but replacing 3,4 - dihydro - 6 - methoxy - 2 - (3 - pyridyl)-1(2H) - naphthalenone by 3,4 - dihydro - 6 - methoxy-2 - (2 - methyl - 3 - pyridyl) - 1(2H) - naphthalenone, there are obtained 1 - (p - methoxyphenyl) - 2 - (2-methyl - 3 - pyridyl) - 6 - methoxy - 3,4 - dihydronaphthalene and the hydrochloride thereof.

EXAMPLE 9

*1 - (p - methoxyphenyl) - 2 - (5 - methyl - 2 - pyridyl)-6 - methoxy - 3,4 - dihydronaphthalene and the hydrochloride thereof*

Using the procedure described in Example 1, but replacing 3,4 - dihydro - 6 - methoxy - 2 - (3 - pyridyl)-1(2H) - naphthalenone by 3,4 - dihydro - 6 - methoxy-2 - (5 - methyl - 2 - pyridyl) - 1(2H) - naphthalenone, there are obtained 1 - (p - methoxyphenyl) - 2 - (5-methyl - 2 - pyridyl) - 6 - methoxy - 3,4 - dihydronaphthalene and the hydrochloride thereof.

EXAMPLE 10

*1-(p-methoxyphenyl)-2-(6-methyl-2-pyridyl)-6-methoxy-3,4-dihydronaphthalene and the hydrochloride thereof*

Using the procedure described in Example 1, but replacing 3,4 - dihydro-6 - methoxy-2-(3-pyridyl)-1(2H)-naphthalenone by 3,4-dihydro-6-methoxy-2-(6-methyl-2-pyridyl)-1(2H)-naphthalenone, there are obtained 1-(p-methoxyphenyl)-2-(6-methyl-2-pyridyl-6 - methoxy - 3,4-dihydronaphthalene and the hydrochloride thereof.

EXAMPLE 11

*1-(p-methoxyphenyl)-2-(2-chloro-3-pyridyl)-6-methoxy-3,4-dihydronaphthalene and the hydrochloride thereof*

Using the procedure described in Example 1, but replacing 3,4-dihydro-6-methoxy-2-(3 - pyridyl) - 1(2H)-naphthalenone by 3,4-dihydro-6-methoxy - 2 - (2-chloro-3-pyridyl) - 1(2H)-naphthalenone, there are obtained 1-(p - methoxyphenyl)-2-(2 - chloro-3-pyridyl)-6-methoxy-3,4-dihydronaphthalene and the hydrochloride thereof.

EXAMPLE 12

*1-(p - methoxyphenyl)-2-(6-ethoxy-2-pyridyl)-6-methoxy-3,4-dihydronaphthalene and the hydrochloride thereof*

Using the procedure described in Example 1, but replacing 3,4-dihydro-6-methoxy - 2-(3-pyridyl) - 1(2H)-naphthalenone by 3,4-dihydro - 6 - methoxy-2-(6-ethoxy-2-pyridyl)-1(2H)-naphthalenone, there are obtained 1-(p-methoxyphenyl)-2-(6-ethoxy - 2 - pyridyl)-6-methoxy-3,4-dihydronaphthalene and the hydrochloride thereof.

EXAMPLE 13

*2-(3 - pyridyl)-3-(p-methoxyphenyl)-5-bromoindene and the hydrochloride thereof*

Using the procedure described in Example 1, but replacing 3,4-dihydro-6-methoxy-2-(3 - pyridyl) - 1(2H)-naphthalenone by 2-(3-pyridyl)-6-bromo - 1 - indanone, there are obtained 2(3-pyridyl)-3-(p-methoxyphenyl)-5-bromoindene and the hydrochloride thereof.

EXAMPLE 14

*2-(3-pyridyl) - 3-(p-methoxyphenyl)-5-chloroindene and the hydrochloride thereof*

Using the procedure described in Example 1, but replacing 3,4-dihydro-6-methoxy - 2-(3-pyridyl) - 1(2H)-naphthalenone by 2-(3-pyridyl)-6-chloro - 1 - indanone, there are obtained 2-(3-pyridyl) - 3-(p-methoxyphenyl)-5-chloroindene and the hydrochloride thereof.

EXAMPLE 15

*2(3-pyridyl)-3-(p-methoxyphenyl)-6-methoxyindene and the hydrochloride thereof*

Using the procedure described in Example 1, but replacing 3,4-dihydro-6-methoxy-2-(3 - pyridyl) - 1(2H)-napthalenone by 2 - (3-pyridyl)-5-methoxy-1-indanone, there are obtained 2-(3-pyridyl) - 3-(p-methoxyphenyl)-6-methoxyindene and the hydrochloride thereof.

EXAMPLE 16

*2-(3-pyridyl)-3-(p-methoxyphenyl)-5,6 - methylenedioxyindene and the hydrochloride thereof*

Using the procedure described in Example 1, but replacing 3,4-dihydro-6-methoxy-2-(3 - pyridyl) - 1(2H)-naphthalenone by 2-(3-pyridyl)-5,6 - methylenedioxy-1-indanone, there are obtained 2 - (3-pyridyl)-3-(p - methoxyphenyl)-5,6-methylenedioxyindene and the hydrochloride thereof.

EXAMPLE 17

*2-(3-pyridyl)-3-(p-methoxyphenyl) - 5-t-butylindene and the hydrochloride thereof*

Using the procedure described in Example 1, but replacing 3,4 - dihydro-6-methoxy-2-(3-pyridyl) - 1(2H)-naphthalenone by 2-(3-pyridyl)-6-t-butyl - 1 - indanone, there are obtained 2-(3-pyridyl)-3-(p-methoxyphenyl)-5-t-butylindene and the hydrochloride thereof.

EXAMPLE 18

*1 - methyl-2-(3-pyridyl)-3-(p-methoxyphenyl)indene and the hydrochloride thereof*

Using the procedure described in Example 1, but replacing 3,4-dihydro - 6 - methoxy-2-(3-pyridyl) - 1(2H)-naphthalenone by 2-(3-pyridyl)-3-methyl - 1 - indanone, there are obtained 1-methyl-2-(3-pyridyl)-3-(p-methoxyphenyl)indene and the hydrochloride thereof.

EXAMPLE 19

*1-propyl-2-(3-pyridyl)-3-(p - methoxyphenyl)indene and the hydrochloride thereof*

Using the procedure described in Example 1, but replacing 3,4-dihydro-6-methoxy-2-(3 - pyridyl) - 1(2H)-naphthalenone by 2-(3-pyridyl)-3-propyl - 1 - indanone, there are obtained 1-propyl-2-(3-pyridyl)-3-(p-metthoxyphenyl)indene and the hydrochloride thereof.

EXAMPLE 20

*2-(3-pyridyl)-3-(p-methoxyphenyl)-4,5 - methylenedioxy-7-allylindene and the hydrochloride thereof*

Using the procedure described in Example 1, but replacing 3,4-dihydro-6-methoxy-2-(3 - pyridyl) - 1(2H)-naphthalenone by 2-(3-pyridyl)-4-allyl - 6,7 - methylenedioxy-1-indanone, there are obtained 2-(3-pyridyl)-3-(p-methoxyphenyl)-4,5-methylenedioxy - 7 - allylindene and the hydrochloride thereof.

EXAMPLE 21

2-(3-pyridyl)-3-(p-methoxyphenyl)-5-trifluoromethylindene and the hydrochloride thereof Using the procedure described in Example 1, but replacing 3,4-dihydro-6-methoxy - 2 - (3-pyridyl)-1(2H)-naphthalenone by 2-(3 - pyridyl)-6-trifluoromethyl-1-indanone, there are obtained 2 - (3-pyridyl)-3-p-methoxyphenyl)-5 - trifluoromethylindene and the hydrochloride thereof.

EXAMPLE 22

1 - (p-methoxyphenyl)-2-(3 - pyridyl)-5-chloro-3,4-dihydronaphthalene and the hydrochloride thereof Using the procedure described in Example 1, but replacing 3,4-dihydro - 6 - methoxy-2-(3-pyridyl)-1(2H)-naphthalenone by 3,4-dihydro-5-chloro-2-(3 - pyridyl)-1(2H)-naphthalenone, there are obtained 1-(p-methoxyphenyl)-2-(3-pyridyl)-5-chloro - 3,4-dihydronaphthalene and the hydrochloride thereof.

EXAMPLE 23

1-(p-methoxyphenyl)-2-(3 - pyridyl)-6,7-methylenedioxy-3,4-dihydronaphthalene and the hydrochloride thereof Using the procedure described in Example 1, but replacing 3,4-dihydro-6-methoxy-2-(3 - pyridyl) - 1(2H)-naphthalenone by 3,4 - dihydro-6,7-methylenedioxy-2-(3-pyridyl)-1(2H)-naphthalenone, there are obtained 1-(p-methoxyphenyl)-2-(3 - pyridyl)-6,7-methylenedioxy-3,4-dihydronaphthalene and the hydrochloride thereof.

EXAMPLE 24

1-(p-methoxyphenyl) - 2 - (3 - pyridyl)-3-methyl-3,4-dihydronaphthalene and the hydrochloride thereof Using the procedure described in Example 1, but replacing 3,4-dihydro-6-methoxy-2-(3 - pyridyl) - 1(2H)-naphthalenone by 3,4-dihydro - 3 - methyl-2-(3-pyridyl)-1(2H)-naphthalenone, there are obtained 1-(p-methoxyphenyl)-2-(3 - pyridyl)-3-methyl-3,4-dihydronaphthalene and the hydrochloride thereof.

EXAMPLE 25

1-(p-methoxyphenyl) - 2 - (3-pyridyl)-4,4-dimethyl-3,4-dihydronaphthalene and the hydrochloride thereof Using the procedure described in Example 1, but replacing 3,4-dihydro-6-methoxy - 2 - (3-pyridyl) - 1(2H)-naphthalenone by 3,4-dihydro-4,4-dimethyl-2-(3-pyridyl)-1(2H)-naphthalenone, there are obtained 1-(p-methoxyphenyl) - 2 - (3 - pyridyl)-4,4-dimethyl - 3,4 - dihydronaphthalene and the hydrochloride thereof.

EXAMPLE 26

5-(p-methoxyphenyl) - 6 - (3-pyridyl) - 8,9-dihydro-7H-benzocycloheptene and the hydrochloride thereof Using the procedure described in Example 1, but replacing 3,4 - dihydro-6-methoxy-2-(3-pyridyl) - 1(2H)-naphthalenone by 6-(3-pyridyl) - 6,7,8,9-tetrahydro-5H-benzocycloheptene - 5 - one, there are obtained 5-(p-methoxyphenyl) - 6 - (3-pyridyl)-8,9-dihydro-7H-benzocycloheptene and the hydrochloride thereof.

EXAMPLE 27

5-(p-methoxyphenyl) - 6 - (3-pyridyl)-7,9-dimethyl-8,9-dihydro-7H-benzocycloheptene and the hydrochloride thereof Using the procedure described in Example 1, but replacing 3,4-dihydro-6-methoxy - 2 - (3-pyridyl - 1(2H)-naphthalenone by 7,9-dimethyl - 6 - (3-pyridyl)-6,7,8,9-tetrahydro - 5H-benzocycloheptene-5-one, there are obtained 5-(p-methoxyphenyl - 6 - (3-pyridyl)-7,9-dimethyl-8,9-dihydro-7H-benzocycloheptene and the hydrochloride thereof.

EXAMPLE 28

1-(p-tolyl)-2-(3-pyridyl)-6-methoxy-3,4-dihydronaphthalene and the hydrochloride thereof Using the procedure described in Example 1, but replacing the Grignard reagent prepared from p-bromoanisole by that prepared from p-bromotoluene, there are obtained 1-(p-tolyl) - 2-(3-pyridyl)-6-methoxy-3,4-dihydronaphthalene and the hydrochloride thereof.

EXAMPLE 29

1-(p-sec-butylphenyl)-2-(3-pyridyl)-6-methoxy-3,4-dihydronaphthalene and the hydrochloride thereof Using the procedure described in Example 1, but replacing the Grignard reagent prepared from p-bromoanisole by that prepared from 1-bromo-4-sec-butylbenzene, there are obtained 1-(p-sec-butylphenyl)-2-(3-pyridyl)-6-methoxy-3,4-dihydronaphthalene and the hydrochloride thereof.

EXAMPLE 30

1-(m-propylphenyl)-2-(3-pyridyl)-6-methoxy-3,4-dihydronaphthalene and the hydrochloride thereof Using the procedure described in Example 1, but replacing the Grignard reagent preparent from p-bromoanisole by that prepared from 1-bromo-3-propylbenzene, there are obtained 1-(m-propylphenyl)-2-(3-pyridyl)-6-methoxy-3,4-dihydronaphthalene and the hydrochloride thereof.

EXAMPLE 31

1-(3,5-diethoxyphenyl)-2-(3-pyridyl)-6-methoxy-3,4-dihydronaphthalene and the hydrochloride thereof Using the procedure described in Example 1, but replacing the Grignard reagent prepared from p-bromoanisole by that prepared from 1-chloro-3,5-diethoxybenzene, there are obtained 1-(3,5-diethoxyphenyl)-2-(3-pyridyl)-6-methoxy-3,4-dihydronaphthalene and the hydrochloride thereof.

EXAMPLE 32

1-(p-dibutylaminophenyl) - 2-(3-pyridyl)-6-methoxy-3,4-dihydronaphthalene and the hydrochloride thereof Using the procedure described in Example 1, but replacing the Grignard reagent prepared from p-bromoanisole by that prepared from p-bromo-N,N-dibutylaniline, there are obtained 1-(6-dibutylaminophenyl)-2-(3-pyridyl)-6-methoxy-3,4-dihydronaphthalene and the hydrochloride thereof.

EXAMPLE 33

1-(p-diethylaminophenyl)-2 - (3-pyridyl)-6-methoxy-3,4-dihydronaphthalene and the hydrochloride thereof Using the procedure described in Example 1, but replacing the Grignard reagent prepared from p-bromoanisole by that prepared from p-bromo-N,N-diethylaniline, there are obtained 1-(p-diethylaminophenyl)-2-(3-pyridyl)-6-methoxy-3,4-dihydronaphthalene and the hydrochloride thereof.

EXAMPLE 34

1-(p-methoxyphenyl)-2-(3-pyridyl)-6-methoxy-3,4-dihydronaphthalene methiodide

A solution of 1 g. of 1-(p-methoxyphenyl)-2-(3-pyridyl)-6-methoxy-3,4-dihydronaphthalene (Example 1) in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of ethyl acetate and ether. There is thus obtained 1-(p-methoxyphenyl)-2-(3-pyridyl) - 6 - methoxy-3,4-dihydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1-(p-methoxyphenyl)-2-(3-pyridyl)-6-methoxy-3,4-dihydronaphthalene.

Similarly, using the procedure described in Example 34, but replacing 1-(p-methoxyphenyl)-2-(3-pyridyl)-6-methoxy-3,4-dihydronaphthalene by any of the free bases prepared as described in Examples 2 through 33, there are obtained the corresponding methiodides and like quaternary salts.

EXAMPLE 35

*1-(p-methoxyphenyl)-2-(3-pyridyl)-6-methoxy-3,4-dihydronaphthalene methochloride*

A solution of 1 g. of 1-(p-methoxyphenyl)-2-(3-pyridyl)-6-methoxy-3,4-dihydronaphthalene methiodide in dimethylformamide is shaken with a slight excess of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 1-(p-methoxyphenyl) - 2-(3-pyridyl)-6-methoxy-3,4-dihydronaphthalene methochloride.

Similarly, using the above procedure but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary ammonium salts of the invention can be exchanged by any other desired anion by forming the corresponding quaternary ammonium hydroxide and reacting the latter with the appropriate acid.

EXAMPLE 36

*1-(p-methoxyphenyl)-2-(3-pyridyl)-6-methoxy-3,4-dihydronaphthalene hydrobromide*

To a solution of 1 g. of 1-(p-methoxyphenyl)-2-(3-pyridyl)-6-methoxy-3,4-dihydronaphthalene in 100 ml. of ether is added dropwise with stirring a slight excess of a 0.1 N ethereal solution of hydrogen bromide. The solid which separates is isolated by filtration, washed with ether, and dried. There is thus obtained 1-(p-methoxyphenyl)-2-(3-pyridyl)-6 - methoxy - 3,4-dihydronaphthalene hydrobromide.

In like manner, employing any of the free bases of Examples 1 through 33 and the appropriate acid, there are obtained the corresponding acid addition salts. Illustratively, using procedures analogues to that described above, the free bases of Examples 1 through 33 are converted to their acid addition salts with sulfuric, nitric, phosphoric, lactic, benzoic, methanesulfonic, p-toluenesulfonic, salicylic, acetic, propionic, malic, tartaric, citric, cyclohexylsulfamic, succinic, nicotinic, and ascorbic acids.

EXAMPLE 37

*2-(3-pyridyl)-3-(p-methoxyphenyl)-7-allyloxyindene and the hydrochloride thereof*

Using the procedure described in Example 1, but replacing 3,4-dihydro - 6-methoxy - 2-(3-pyridyl)-1(2H)-naphthalenone by 2-(3-pyridyl)-4-allyloxy-1-indanone, there are obtained 2-(3-pyridyl)-3-(p-methoxyphenyl)-7-allyloxyindene and the hydrochloride thereof.

EXAMPLE 38

*2-(3-pyridyl)-3-(p - methoxyphenyl) - 1-ethyl-6-chloro-5-methylthioindene and the hydrochloride thereof*

Using the procedure described in Example 1, but replacing 3,4-dihydro - 6 - methoxy-2-(3-pyridyl)-1(2H)-naphthalenone by 2-(3-pyridyl)-3-ethyl-5-chloro-6-methylthio-1-indanone, there are obtained 2-(3-pyridyl)-3-(p-methoxyphenyl)-1-ethyl-6-chloro - 5-methylthioindene and the hydrochloride thereof.

EXAMPLE 39

*2-(3-pyridyl)-3-(p-methoxyphenyl)-6-diethylaminoindene and the hydrochloride thereof*

Using the procedure described in Example 1, but replacing 3,4-dihydro-6 - methoxy - 2-(3-pyridyl)-1(2H)-naphthalenone by 2-(3-pyridyl) - 5 - diethylamino-1-indanone, there are obtained 2-(3-pyridyl)-3-(p-methoxyphenyl)-6-diethylaminoindene and the hydrochloride thereof.

EXAMPLE 40

*2-(3-pyridyl)-3-(p-methoxyphenyl)-5-dimethylaminoindene and the hydrochloride thereof*

Using the procedure described in Example 1, but replacing 3,4 - dihydro - 6 - methoxy-2-(3-pyridyl)-1(2H)-naphthalenone by 2-(3-pyridyl)-6-dimethylamino-1-indanone, there are obtained 2-(3-pyridyl)-3-(p-methoxyphenyl)-5-dimethylaminoindene and the hydrochloride thereof.

EXAMPLE 41

*2-(3-pyridyl)-3-(p-methoxyphenyl)-7-(3-methyl-1-pyrrolidinyl)indene and the hydrochloride thereof*

Using the procedure described in Example 1, but replacing 3,4 - dihydro - 6 - methoxy-2-(3-pyridyl)-1(2H)-naphthalenone by 2-(3-pyridyl)-4-(3-methyl-1-pyrrolidinyl)-1-indanone, there are obtained 2-(3-pyridyl)-3-(p-methoxyphenyl)-7-(3-methyl-1 - pyrrolidinyl)indene and the hydrochloride thereof.

EXAMPLE 42

*2-(3-pyridyl)-3-(p-methoxyphenyl)-5-cyclohexyloxyindene and the hydrochloride thereof*

Using the procedure described in Example 1, but replacing 3,4 - dihydro - 6 - methoxy-2-(3-pyridyl)-1(2H)-naphthalenone by 2-(3-pyridyl)-6-cyclohexyloxy-1-indanone, there are obtained 2-(3-pyridyl)-3-(p-methoxyphenyl)-5-cyclohexyloxyindene and the hydrochloride thereof.

We claim:
1. 1 - pheny l- 2 - (3-pyridyl)-6-methoxy-3,4-dihydronaphthalene.
2. 1 - phenyl - 2 - (3-pyridyl)-6-methoxy-1,2,3,4-tetrahydro-1-naphthol.

No references cited.

HENRY R. JILES, *Primary Examiner.*
R. T. BOND, *Assistant Examiner.*